Dec. 25, 1923.
P. G. UNDERWOOD
PICTURE HANGER
Filed July 17, 1922
1,478,461
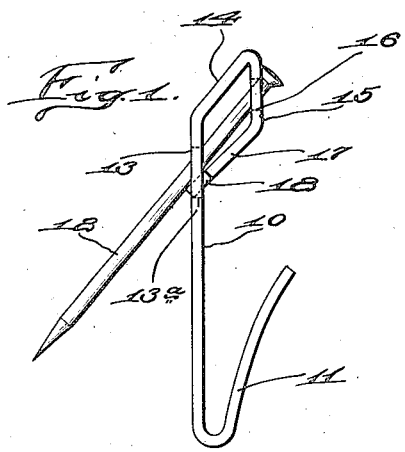
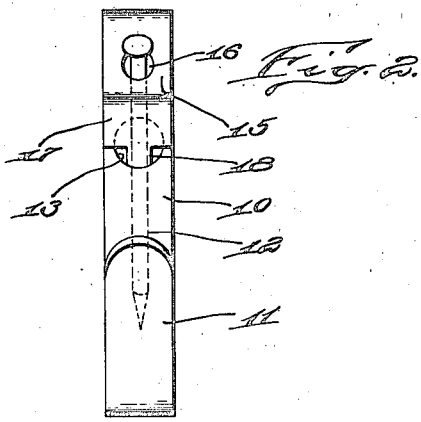
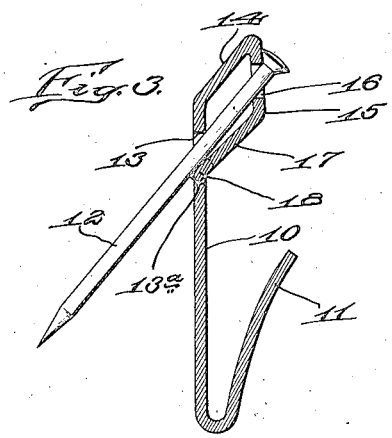
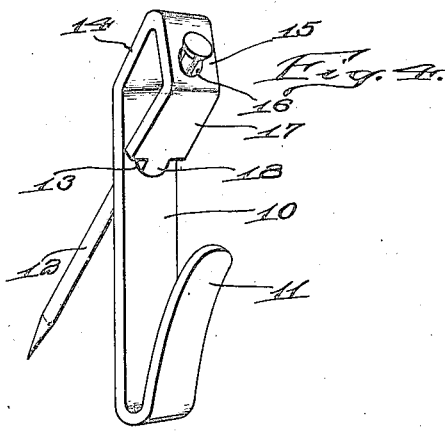
Inventor:
Percival G. Underwood
By Henry G. Thomson
Atty.

Patented Dec. 25, 1923.

1,478,461

UNITED STATES PATENT OFFICE.

PERCIVAL G. UNDERWOOD, OF PHILADELPHIA, PENNSYLVANIA, ASSIGNOR TO GRAFF-UNDERWOOD COMPANY, OF SOMERVILLE, MASSACHUSETTS, A CORPORATION OF MASSACHUSETTS.

PICTURE HANGER.

Application filed July 17, 1922. Serial No. 575,456.

*To all whom it may concern:*

Be it known that I, PERCIVAL G. UNDERWOOD, a citizen of the United States of America, residing at Philadelphia, in the county of Philadelphia and State of Pennsylvania, have invented new and useful Improvements in Picture Hangers, of which the following is a specification.

This invention relates to hangers or wall fastenings for the suspension of picture frames or the like on a wall, of the type wherein the hanger proper equipped with a suitable hook has associated therewith a pin or light nail with such pin or nail held so as to be driven into the wall at an acute downward angle. Hangers of this kind as heretofore commonly made have been subject to the objection that the pin or nail is not fixedly and securely assembled with the hanger proper and is hence apt to be lost or misplaced. One object of the present invention is to provide a hanger of the kind stated wherein the nail or pin is assembled with the hook member or hanger proper in the course of manufacture in a manner so that it is held against casual dislodgment and always in readiness for use. A further object is to provide a simple, strong and reliable hanger that is comparatively inexpensive to manufacture. The foregoing and other objects and advantages of the invention will more fully appear from the following detailed description taken in connection with the accompanying drawings, and the distinctive features of novelty will be pointed out in the appended claims.

Referring to the drawings:

Fig. 1 is a side elevation of a hanger embodying the invention;

Fig. 2 is a front view thereof;

Fig. 3 is a transverse vertical section; and

Fig. 4 is a perspective view of the hanger.

10 indicates the hanger proper equipped at its lower portion with a suitable hook 11, this being produced of a narrow strip of fairly stiff sheet metal. 12 indicates a pin or light nail which is permanently assembled with the hanger as now to be described. For this purpose the hanger strip 10 is provided some distance above the hook with a hole 13 therethrough large enough to permit the pin 12 to be inserted therethrough at an acute angle as shown. A small distance above this hole the strip is bent as indicated at 14 so as to extend a small distance in approximate parallelism with the pin as thus assembled at an acute angle with the hanger. Thence the strip is bent downward at an acute angle to approximate parallelism with the body portion thereof as indicated at 15 and this portion is also provided with a hole 16 of a dimension to permit the pin to be passed therethrough when disposed at such acute angle and when passing also through the hole 13. Thence the end portion of the strip is bent inward as indicated at 17 and a tongue 18 at the extremity thereof is pressed into the lower portion of the hole 13 below the pin 12 and so as to press thereagainst. This results in a binding grip upon the pin exerted by the opposite edges of the hole 16 and by the upper edge of the hole 13 as well as by the tongue 18, which is pressed or crimped in against the pin and so as to be caught by the lower wall of the hole 13 as indicated at 13ª. In this way the pin is securely held assembled with the hanger so that as supplied for use, the hanger with the pin is a complete unit always ready for use without requiring the user to take the time and care of assembling the hanger with the pin and keeping them assembled when the nail is being driven into the wall. The pin however is not held or gripped so strongly to the strip or body of the hanger as to prevent it from being pressed therethrough when such manipulation is required as in affixing the hanger to a wall. Further the bending and crimping of the upper end portion of the strip around the outer portion of the pin stiffens and reinforces the pin so that it is less liable to bend or cause trouble in pressing or driving the same into a wall. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A hanger comprising a body equipped with a hook and with its upper portion constituting a nail-holding head and bent first diagonally outward then downward and finally inward, with two nail-receiving holes at different elevations in said head, the upper one of said holes being in the outer bent-down portion of the head and the lower hole being in the inner vertical body portion below said diagonal outward bend, and with the extremity of the bent portion in position to press frictionally upon the nail at the locality of the lower and inner one of said holes.

2. A hanger comprising a body of strip material equipped with a hook and with its upper portion bent to constitute a nail-receiving head with nail-receiving holes therein at different elevations, the upper one of said holes being in an outwardly projected portion of said head, and the lower hole being in the inner vertical body portion thereof substantially at the base of said head, and with the extremity of the material of said head extending inward of the lower and inner one of said holes to press frictionally upon a nail engaged therein.

In testimony whereof I affix my signature in presence of two witnesses.

PERCIVAL G. UNDERWOOD.

Witnesses:
 GEO. B. GRAFF,
 HENRY C. THOMSON.